Sept. 11, 1956  F. E. BACHMAN  2,762,468
BRAKE HEAD AND SHOE CONNECTION
Filed Aug. 22, 1952  3 Sheets-Sheet 2
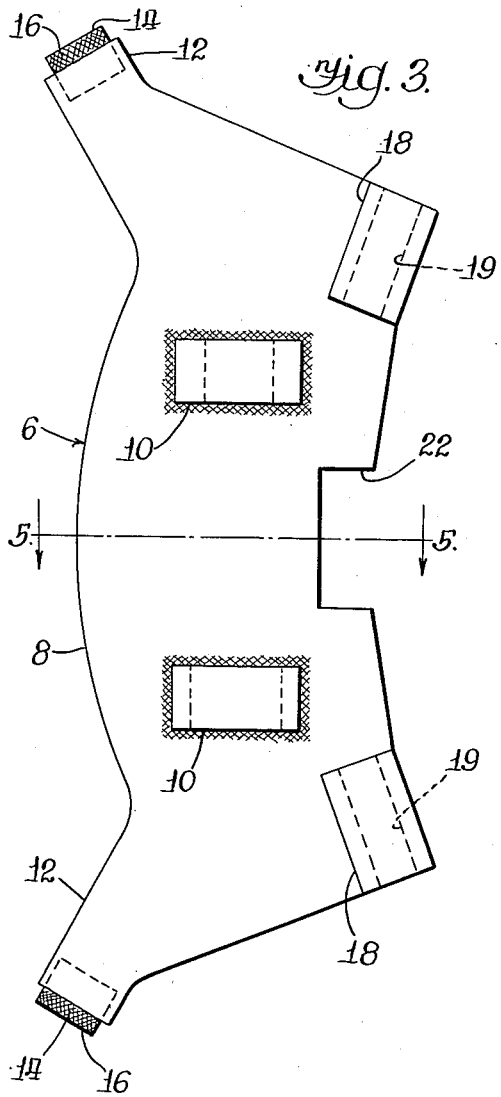
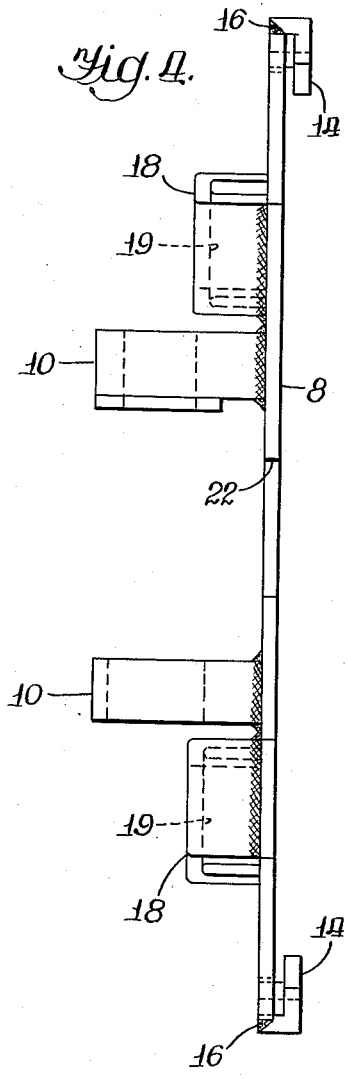
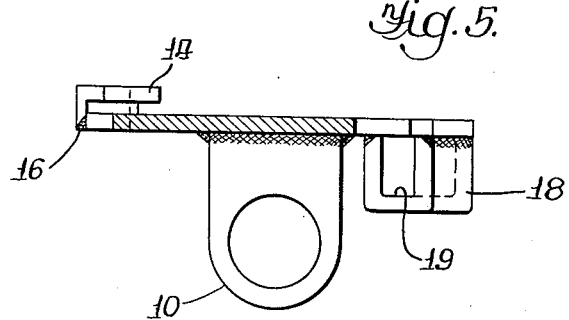
INVENTOR.
Fred E. Bachman
BY
O. B. Garner
Atty.

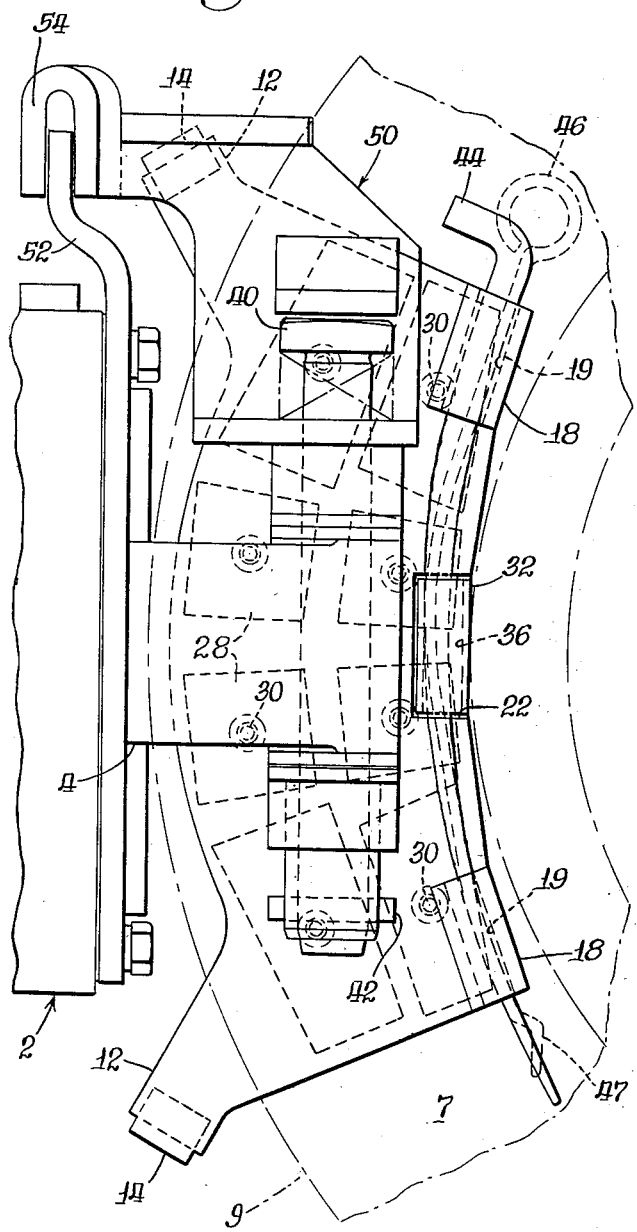

Sept. 11, 1956      F. E. BACHMAN      2,762,468
BRAKE HEAD AND SHOE CONNECTION
Filed Aug. 22, 1952      3 Sheets-Sheet 3

INVENTOR.
Fred E. Bachman
BY
O. B. Garner
Atty.

United States Patent Office 2,762,468
Patented Sept. 11, 1956

2,762,468

BRAKE HEAD AND SHOE CONNECTION

Fred E. Bachman, Granite City, Ill., assignor to American Steel Foundries, Chicago, Ill., a corporation of New Jersey Application August 22, 1952, Serial No. 305,791

4 Claims. (Cl. 188—243)

The invention relates to railway brake equipment and more particularly to a novel brake head-brake shoe arrangement.

An object of the invention is to provide a novel and improved brake head-brake shoe arrangement for use on equipment known in the art as rotor brakes.

The invention comprehends a brake head connected to a standard rotor brake lever in the conventional manner, a brake shoe having a backing plate with brake blocks fixedly secured thereto, and means to demountably fix the bracking plate to the brake head.

Thus a further object of the invention is to provide a brake head arrangement with a separable discardable brake shoe.

Another object of the invention is to design a brake shoe of the type described wherein a standard brake shoe key is utilized to secure the brake shoe to the head.

It is a further object of the invention to provide an arrangement of the type described whereby field operation, service and repair is facilitated and improved.

Yet another object of the invention is to provide an arrangement of the type described wherein shoe replacement costs are reduced to a practical minimum.

Still another object of the invention is to provide an alternate retaining key for use with the above described arrangement.

These and other objects of the invention will become apparent in the course of the following description and from an examination of the drawings, wherein:

Figure 1 is a side elevational view of an assembled embodiment of the invention;

Figure 2 is a front elevational view of the structure shown in Figure 1;

Figures 3, 4 and 5 are detailed views of the brake head utilized in Figure 1, and Figures 6, 7 and 8 are detailed views of the brake shoe utilized in Figure 1.

Figure 6:
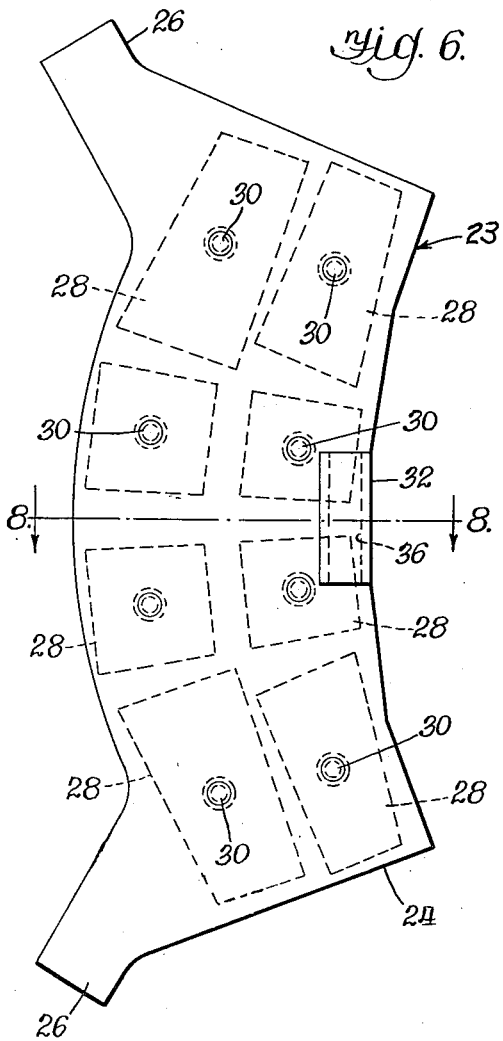

Describing the invention in detail, a rotor brake housing indicated generally at 2 is secured to a railway truck frame (not shown) in the conventional manner and carries brake actuating levers movably extending from one end thereof, one of which is shown at 4 in Figures 1 and 2. A brake head-brake shoe arrangement 6 is pivotally carried on the outboard end of the brake actuating lever in such a manner as to be engageable with the friction surface 7 of an associated rotor 9 which is secured to a wheel and axle assembly (not shown) of a conventional railway car truck.

Referring now to Figures 3 to 5, it will be seen that the brake head 6 comprises a generally flat irregularly contoured substantially crescent-shaped plate 8 having rigidly secured to and extending from one side thereof the mounting lugs 10, 10. At one edge of the plate and at points above and below the horizontal center line of said plate, the plate presents extended arms 12, 12, each arm carrying a brake shoe mounting hook 14 at points adjacent the end of said arm. It will be noted that the hooks 14, 14 may be formed integrally with the arms 12, 12 or may be affixed thereto by any suitable means, such as welding utilized in the preferred embodiment at 16, 16. At the opposite edge of the plate 8 and again at points above and below the horizontal center line of said plate, shoe mounting bosses 18, 18 are positioned and may be secured to the plate by any suitable means, such as by welding. The bosses 18, 18 define key slots 19, 19 which converge toward each other and toward the horizontal center line of the plate 8. Intermediate the bosses 18, 18 and at the horizontal center line of the plate 8, the plate presents the notch 22, the function of which will be hereinafter described.

Figure 7:
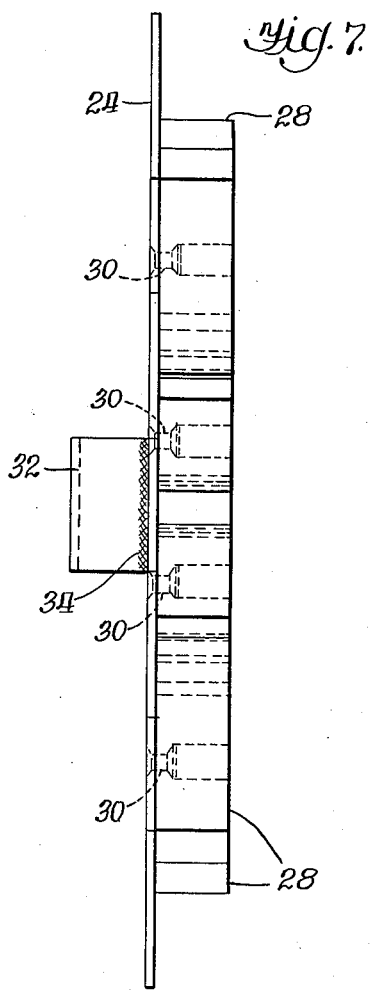
Figure 8:
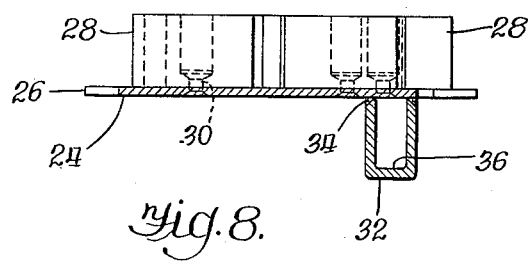

Referring now to Figures 6, 7 and 8, it will be seen that the brake shoe assembly, generally designated 23, comprises a backing plate 24 of irregular contour, said contour being similar to that of the brake head plate 8 and including arms 26, 26 which complement in form and position the arms 12, 12 of said brake head plate. A plurality of brake blocks 28 are affixed to one side of the backing plate 24 by positioning same thereon and cementing same thereto in a manner well known in the art. Each block is then drilled through and counterbored and the mounting plate is drilled and countersunk to provide for the heads of rivets 30 which also act to secure the blocks 28 to backing plate 24. It will be understood, of course, that the brake blocks are formed of a standard composition material having a high frictional coefficient.

On the side of the backing plate opposite the brake blocks a boss 32 is positioned and secured thereto in any suitable manner, for example by welding shown at 34. The boss 32 defines and presents a key slot 36 disposed vertically, that is, perpendicularly to the horizontal center line of the plate at a point along the edge of said plate.

As noted above, the brake lever 4 extends from the rotor brake housing 2 and is disposed intermediate the mounting lugs 10, 10 of the brake head 6. Registering holes in the brake head mounting lugs 10 and brake lever 4 receive the pivot pin 40 whereby the brake head 6 is pivotally mounted on the lever 4. A cotter key 42 is disposed within a transverse hole in the lower end of the pin 40 thereby maintaining said pin in position.

The brake shoe assembly 23 is positioned in flat face engagement with the inboard face of the brake head while the arms 26, 26 of the assembly interfit with the mounting hooks 14, 14 of the arms 12, 12 of the brake head 6. With the brake shoe assembly in this position, the boss 32, which is mounted on the backing plate complementally fits within the notch 22 of the brake head 6, and extends above the outer surface of the brake head where it is arcuately aligned with the bosses 18, 18 of the brake head 6.

A standard arcuately formed key 44 is then disposed within the key slots 19, 19 and 36 of the bosses 18, 18 and 32, respectively, whereby the brake shoe assembly 23 is locked firmly in position upon the brake head by means of the key interlocking the boss 32 of the brake shoe assembly and wedging the backing plate 24 tightly into engagement with the hooks 14, 14 of the brake head.

In the alternative, I have designed a spring steel key indicated in phantom lines at 46. The key 46 is bowed to bear on the forward edges of the key slots 19, 19 and the rear edge of the slot 36 (Figure 1), thereby locking the shoe assembly in position and wedging same against the hooks 14, 14. At its lower end the key 46 is preferably provided with an offset portion 47 to maintain the key in position within the key slots.

Attached to the brake head by means of the upper mounting lugs 10 on the pivot pin 40 is the brake head guiding device indicated generally at 50. The guiding device is described in detail in the copending application, Serial No. 211,515, filed February 17, 1951, and now Patent Number 2,690,237, in the name of William J.

Casey III. Suffice it to say that the guide device 50 comprises a guiding tongue 52 secured to the brake housing 2 and received by an inverted U-shaped guide 54 secured to the pivotally free brake head 6, said guide receiving the tongue 52 and coacting therewith to direct the related shoe linearly into and out of full face engagement with the associated surface of the brake disk mounted on the wheel and axle assembly.

As the brake blocks wear from long operational use, replacement now becomes a simple matter. Removal of the key 44 allows the brake shoe assembly 23 to fall free of the brake head. A new assembly 23 is positioned on the head, the key is then repositioned and the worn part is replaced without the necessity of disassembling the brake head and brake head guide as is required in current structures.

I claim:

1. In a brake arrangement of the type described, a brake head comprising a plate having at one edge thereof extending arms and having a notch formed on another edge thereof, bosses defining key slots disposed on said plate in arcuate alignment on opposite sides of said notch, positioning means comprising hook means secured to said extending arms on said plate, a demountable brake shoe assembly complementally received by said positioning means and having a boss defining a key slot complementally received by said notch, and key means disposed within said key slots whereby said key means and positioning means cooperate to wedge said assembly on said head.

2. In a brake arrangement of the type described, a brake head having a notch formed therein, key slot defining bosses disposed on opposite sides of said notch, positioning hooks secured to the head, a brake shoe assembly comprising a backing plate having a plurality of brake blocks secured to one face thereof, a key slot defining boss secured to said plate and extending through said notch, portions of said plate being received by said positioning hooks, and key means disposed within said slots operative to wedge said plate into said hooks and maintain said assembly on said head.

3. In a brake arrangement of the type described, an irregularly shaped brake head pivotally mounted on an associated brake lever, positioning hooks secured along one edge of said head, a notch formed in said head along the edge opposite the mentioned edge and at approximately the horizontal center line of said head, key slot defining bosses disposed above and below said notch, a brake shoe assembly comprising a backing plate having brake blocks disposed and secured in crescent formation to one side of said plate, a key slot defining boss secured to the side opposite the mentioned side of said plate, said brake shoe assembly being positioned in flat face engagement with the brake head and having portions of said plate received by said positioning hooks and having the second mentioned boss disposed within said notch, and a key disposed within said key slots operative to secure said assembly to said head.

4. In a brake arrangement of the type described, a brake head comprising a flat plate having arms diverging from one edge thereof, a demountable brake shoe comprising a flat plate having friction material secured to one face thereof, spaced key slot defining bosses rigidly secured to said brake head plate, another key slot defining boss rigidly secured to said brake shoe plate, said brake head plate having a slot to receive said second mentioned boss intermediate said first mentioned bosses when said plates are in flat face engagement, hook means on the ends of said arms receiving portions of the brake shoe plate, and arcuate key means extending through said bosses, said key means cooperating with said hook means to wedge said plates in assembled relationship.

References Cited in the file of this patent

UNITED STATES PATENTS

| | | |
|---|---|---|
| 807,370 | Gallagher | Dec. 12, 1905 |
| 854,761 | Remelius | May 28, 1907 |
| 978,772 | McConnell | Dec. 13, 1910 |
| 2,110,574 | Harbert et al. | Mar. 8, 1938 |
| 2,236,311 | Eksergian | Mar. 25, 1941 |
| 2,272,647 | Simanek | Feb. 10, 1942 |
| 2,451,329 | Gaenssle | Oct. 12, 1948 |
| 2,504,712 | Mann | Apr. 18, 1950 |